Dec. 26, 1922.
J. A. ARMSTRONG.
SECURING DEVICE FOR PLATES AND THE LIKE.
FILED APR. 18, 1922.
1,439,682.
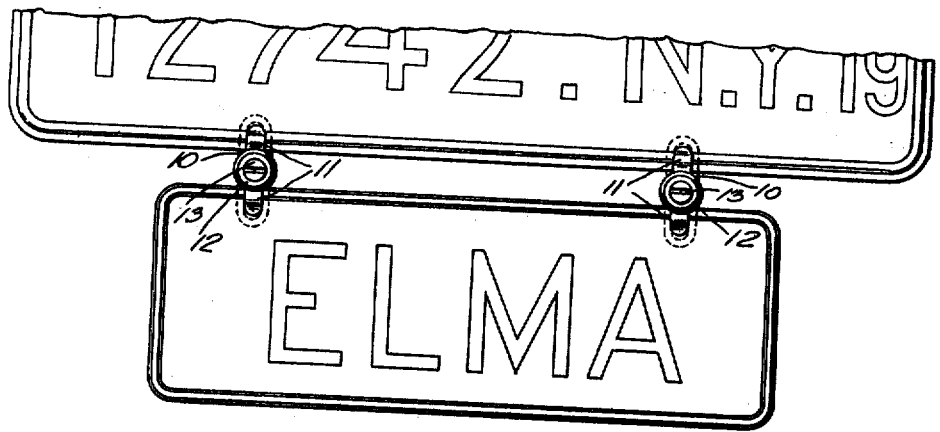
Fig. 1.
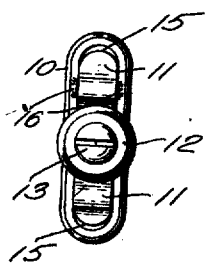 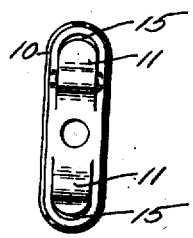 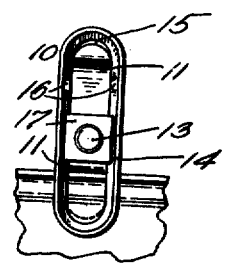
Fig. 2.    Fig. 3.    Fig. 4.
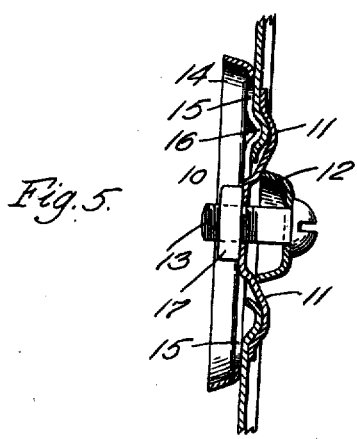 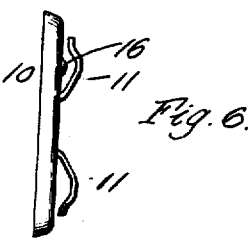
Fig. 5.    Fig. 6.
INVENTOR
John A. Armstrong
by Parker & Brockman
ATTORNEYS Patented Dec. 26, 1922.

1,439,682

UNITED STATES PATENT OFFICE.

JOHN A. ARMSTRONG, OF NIAGARA FALLS, NEW YORK, ASSIGNOR TO NIAGARA METAL STAMPING CORPORATION, OF NIAGARA FALLS, NEW YORK.

SECURING DEVICE FOR PLATES AND THE LIKE.

Application filed April 18, 1922. Serial No. 554,617.

*To all whom it may concern:*

Be it known that I, JOHN A. ARMSTRONG, a citizen of the United States, residing at Niagara Falls, in the county of Niagara and State of New York, have invented a new and useful Improvement in Securing Devices for Plates and the like, of which the following is a specification.

This invention relates to securing devices for fastening automobile license and designation plates or other thin plates or objects together side by side. Designating plates bearing the names of towns or localities are frequently used on automobiles above or below the license number plates of the automobiles for indicating the towns or localities from which the automobiles come. This invention relates particularly to securing devices adapted for securing such plates together one below the other in the same plane. The securing or fastening devices forming the subject matter of the invention are not, however, restricted to this use but are suitable for securing or holding other thin plates or objects.

One of the objects of the invention is to produce a strong, practical and neat securing device which is of simple and inexpensive construction, is composed of the minimum number of parts and will securely and rigidly hold the plates or objects in place. Other objects of the invention are to construct a securing device that can be readily applied with the minimum amount of trouble and skill for fastening the plates or objects, and which is not composed of disconnected parts that will be troublesome to retain in place while applying the device for fastening the plates or objects; and also to improve securing or fastening devices in the other respects hereinafter described and set forth in the claims.

In the accompanying drawings:

Fig. 1 is a front elevation of a license and locality indicating plate, or analogous plates, connected by securing devices embodying the invention.

Fig. 2 is a face view of the securing device.

Fig. 3 is a face view of the body of the device.

Fig. 4 is a rear face view of the securing device.

Fig. 5 is an enlarged longitudinal sectional elevation of the securing device attached to the plates.

Fig. 6 is a side elevation of the body of the securing device.

The securing device comprises a body or main plate 10 provided with attached tongues 11 which extend from the intermediate portion of the body towards the edges thereof with the free end of each tongue spaced from the body 10, and a pressure member 12 which is adjustably connected to the body 10 as by a screw or the like 13 and bears against the tongues 11 so that the tongues can be forced towards the body to grip objects by turning the screw. The main plate or body 10 and tongues 11 are preferably stamped from sheet metal and the body is provided with a rearwardly projecting marginal flange 14 which completely surrounds the body plate 10 and stiffens the same, making the body 10 very stiff and strong notwithstanding that it can be formed of comparatively light gauge sheet metal. The tongues 11 are formed by integral portions of the body plate 10 which are partially severed from and struck up from the plate. These tongues are preferably bent transversely between their ends so that their ends extend towards the body plate 10, while their intermediate portions are bowed outwardly away from the face of the plate 10. This formation of the tongues enables them to fit over beads or protrusions on the plates or objects with which the securing device is used and ensure a better hold thereon. The side edges of one or both of the tongue slots 15 in the plate 10 can be, if desired, bulged or bent outwardly opposite the bend in the opposing tongue 11, thus forming projections 16 on the plate cooperating with the bend in the tongue to ensure a firm hold on a headed plate or object. Automobile license and location indicating plates are sometimes provided with an ornamental border bead which is convex on the front face and concave on the rear face of the plate, and by bending the tongue and providing the projections 16 on the securing device as explained, these parts interfit with the concave and convex faces of the bead on the plate and insure a very secure, firm hold of the securing device on the plate and prevent the securing device from twisting or rocking on the plate or object.

The pressure member 12 in the form shown in the drawings consists of a cupped or flanged washer having a central hole through which the securing screw 13 passes, and the washer is arranged with its flange bearing against the outer face of the two tongues 11 so that when the screw is tightened the pressure member is forced toward the body plate 10 and forcibly presses the tongues toward the plate so that they will tightly clamp or grip the plates or other objects between the tongues and the body plate 10. The pressure member can be of any suitable form or shape adapted to bear on the two tongues so as to press the tongues toward the plate 10 when the screw is tightened, but the circular flanged washer shown is inexpensive to make and is efficient in use as it will properly bear upon the tongues in any position to which the pressure member may happen to turn about the screw. The securing screw preferably passes loosely through a hole in the body plate 10 between the two tongues and screws into a nut 17 which is arranged at the rear side of the plate 10 between the marginal flanges at the opposite edges of the plate. These flanges hold the nut from turning so that the securing device can be fastened simply by turning the screw by means of a screw driver, without the necessity of holding the nut by means of a wrench or other tool while tightening the screw.

Since the tongues 11 are integral with or permanently attached to the body plate 10, the cooperating clamping members of the device cannot become disconnected or displaced and this makes the securing device very much easier of application because it is only necessary to insert the edges of the plates or objects to be secured between the body plate and the tongues of the securing device and it is not necessary to assemble and properly retain in position disconnected parts while securing the device, which would be very awkward, especially in view of the small size of the securing device and the fact that is is often necessary to apply the same in more or less inaccessible places.

I claim as my invention:

1. A securing device for connecting plates and analogous objects comprising a body, and tongues permanently attached to said body intermediate of its edges and extending towards the edges of said body, each tongue and the opposing portion of the body forming jaws adapted to receive and grip a plate or object, a pressure member which bears against the outer sides of said tongues, and a screw member connected to said body and engaging said pressure member for forcing the same and the tongues toward the body to tightly clamp the plates or objects between the tongues and the body.

2. A securing device for connecting plates and analogous objects comprising a body, and tongues struck up from said body and extending from the intermediate portion of the body towards the edges thereof, said tongues and the opposing portions of the body forming jaws adapted to receive and grip plates or analogous objects, a screw device connected to said body, and means whereby said screw device bears against said tongues for forcing the same toward the body to tightly clamp the plates or objects between the tongues and the body.

3. A securing device for connecting plates and analogous objects comprising a body plate provided with a stiffening marginal flange and integral tongues struck up from said body plate and extending from the intermediate portion of the plate towards the edges thereof, said tongues and opposing portions of said body plate forming jaws adapted to receive and grip plates or analogous objects, a pressure member engaging the outer sides of said tongues, and a screw device connected to said body plate and engaging said pressure member for forcing the same and tongues toward said body plate to tightly clamp the plates or objects.

4. A securing device for connecting plates and analogous objects comprising a body plate provided with a rearwardly projecting marginal flange and integral tongues struck up from said body plate and extending outwardly from an intermediate portion thereof, said tongues and the opposing portions of said body plate forming jaws adapted to receive and grip plates or analogous objects, a pressure plate arranged to engage the outer sides of said tongues, a screw passing through said pressure member and a hole in said body plate between said tongues, and a nut having a screw threaded engagement with said screw and which is held from turning between the marginal flanges of said body plate.

5. A securing device for connecting plates and analogous objects comprising a body plate provided with a rearwardly projecting marginal flange and integral tongues struck up from said body plate and extending outwardly from an intermediate portion thereof, said tongues and the opposing portions of said body plate forming jaws adapted to receive and grip plates or analogous objects, a flanged washer arranged to bear against the outer sides of said tongues, a screw passing through said washer and through a hole in said body plate, and a nut having a screw threaded engagement with said screw and which is held from turning between the marginal flanges of said body plate.

6. A securing device for connecting plates and analogous objects comprising a body plate provided with a stiffening marginal flange and integral tongues struck up from said body plate and extending from an intermediate portion of the body plate towards the edges thereof, said tongues and opposing portions of said body plate forming jaws adapted to receive and grip plates or analogous objects, or both of said tongues being bowed outwardly and said body plate having projections extending toward the bend in said tongue, a screw device connected to said body plate, and means whereby said screw device bears against said tongues for forcing the tongues toward the body plate to tightly clamp the plates or objects.

JOHN A. ARMSTRONG.